March 18, 1941.　　S. H. ATKINSON　　2,235,306
SEALING MEANS
Filed Oct. 31, 1938　　4 Sheets-Sheet 1

STANLEY H. ATKINSON,
INVENTOR.

BY Robert M. McManigal
ATTORNEY

March 18, 1941. S. H. ATKINSON 2,235,306
SEALING MEANS
Filed Oct. 31, 1938 4 Sheets-Sheet 2

STANLEY H. ATKINSON,
INVENTOR.
BY Robert N. McManigal
ATTORNEY

March 18, 1941.　　S. H. ATKINSON　　2,235,306
SEALING MEANS
Filed Oct. 31, 1938　　4 Sheets-Sheet 3
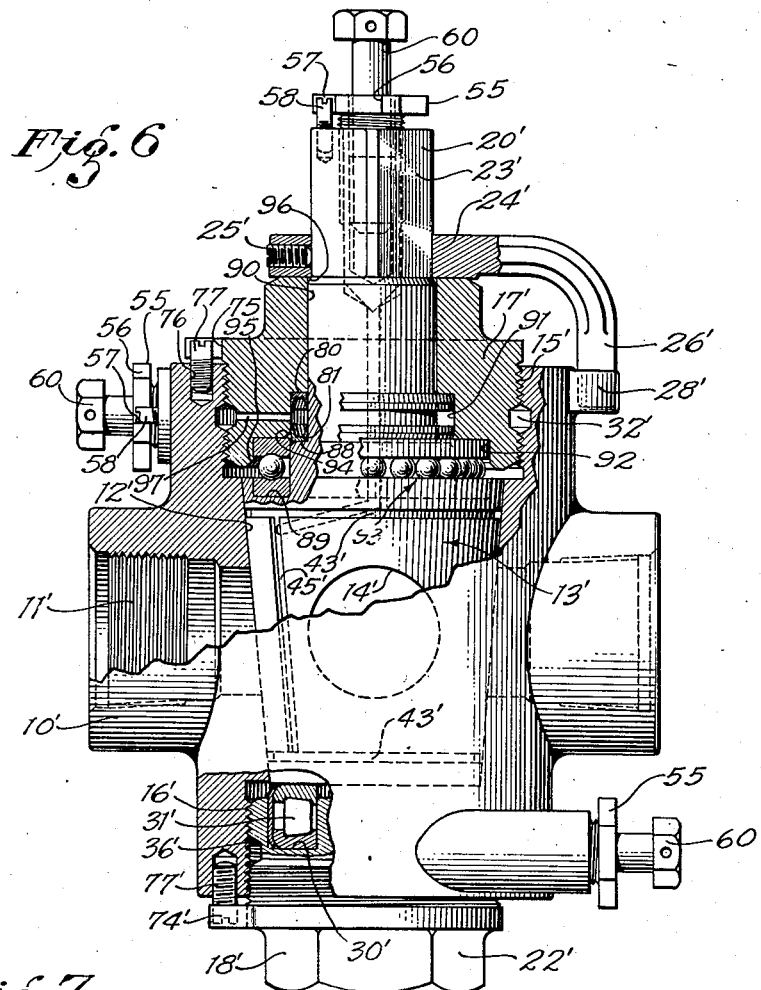
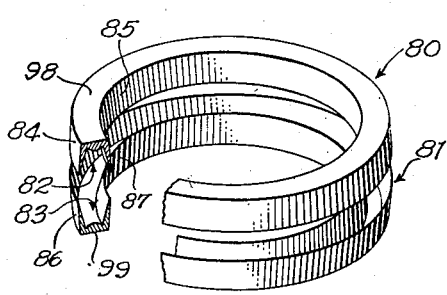
STANLEY H. ATKINSON,
INVENTOR.
BY Robert M. McManigal
ATTORNEY Patented Mar. 18, 1941

2,235,306

UNITED STATES PATENT OFFICE 2,235,306

SEALING MEANS

Stanley H. Atkinson Compton, Calif., assignor to MacClatchie Manufacturing Company of California, Compton, Calif., a corporation of California Application October 31, 1938, Serial No. 237,944

5 Claims. (Cl. 251—103)

This invention relates to a sealing means for a seating or bearing surface and for the purpose of illustration is herein described as applied to a plug valve.

In certain plug valves, sealing rings are used which are expanded into sealing engagement by fluid pressure caused by the leakage of the fluid in the flow line which is controlled by the plug valve and by lubricant pressure applied to the lubricant which is adapted to lubricate the valve.

The disadvantage is that the fluid from the flow-line not only causes the sealing rings to expand, but also dissolves or washes away the lubricant which lubricates the valve. Another disadvantage is that the fluid in the line also has a deleterious effect on the sealing rings, which are usually constructed of rubber, leather, or like material.

It is therefore an object of my invention to provide a sealing means in which the seal is maintained entirely by a sealing liquid, which liquid is entirely out of contact with the fluid in the flow-line, and which sealing means is entirely independent of expansion of the plug, housing, or any other part of the device in which the sealing means of my invention is adapted to be used.

A further object of the invention is to provide a sealing means for valves, pumps, bearings, and other objects having surfaces which are required to be sealed off under high pressure operating conditions without interfering in any manner whatever with the operation of the device.

Another object of my invention is to provide a sealing means which is inexpensive to manufacture and which is easy and convenient to install.

More particularly, it is an object of my invention to seal a plug valve by means of cooperating sealing rings having annular grooves which are adapted to face each other, in which the outer edges of said annular grooves are adapted to be held in sealing engagement by means of the sealing liquid pressure, in which the sealing liquid cannot escape into the flow line, and in which fluid from the flow line which is controlled by the valve is maintained entirely out of contact with said annular grooves.

My invention has many other objects, advantages, and features, some of which, with the foregoing, will be set forth at length in the following description where I shall outline certain forms of the invention, which I have selected for illustration in the drawings accompanying and forming a part of the present specification. In the said drawings, I have shown certain forms of my invention as applied to plug valves, but it is to be understood that I do not limit myself to such forms, since the invention, as expressed in the claims, may be embodied in a large plurality of forms.

Referring to the drawings:

Fig. 6 is a longitudinal section of a plug valve illustrating a modified form of the invention.

Fig. 7 is an enlarged perspective view of the sealing rings shown in Figure 6.

Figure 1:
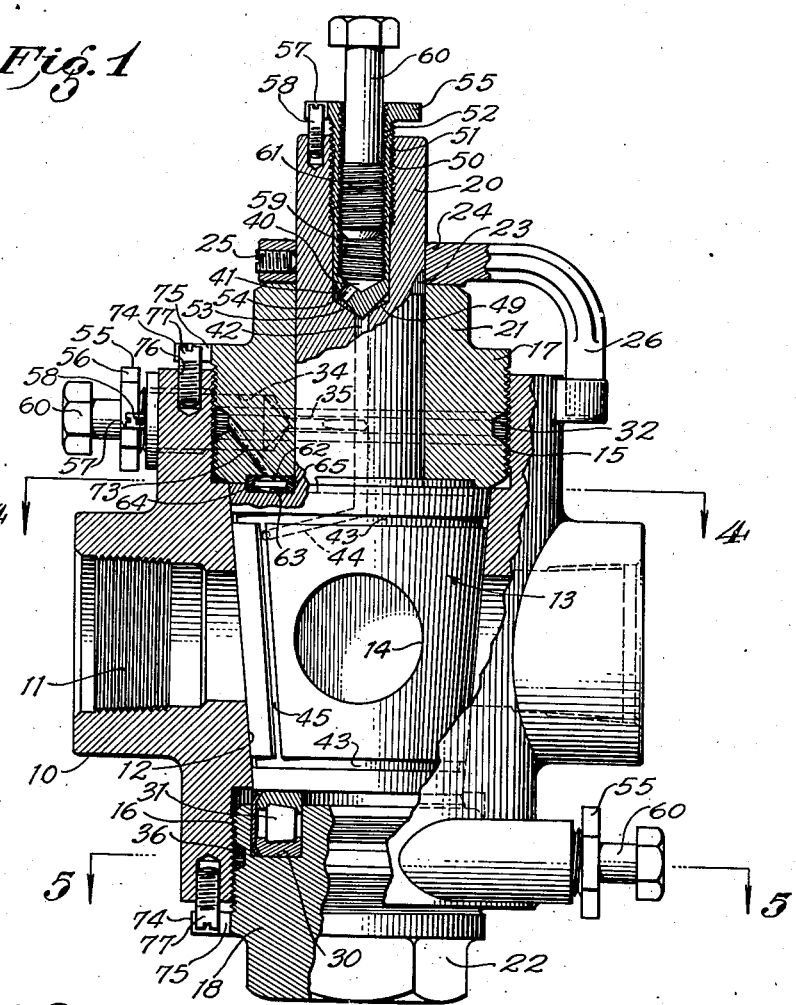
Fig. 1 is a longitudinal section of a plug valve embodying the features of the invention.
Figure 2:
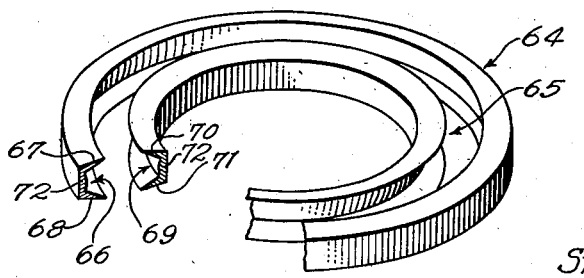
Fig. 2 is an enlarged perspective view of the sealing rings shown in Fig. 1.

The invention is applicable to any article having surfaces requiring lubrication under high pressure operating conditions, for example, a plug valve.

The plug valve shown in Figs. 1-5 inclusive, comprises a valve casing 10 having a fluid passageway 11 and longitudinal opening 12 with a valve plug 13 rotatable in longitudinal opening 12, said valve plug having a transverse hole 14 adapted for alinement or non-alinement with fluid passageway 11 when the plug is rotated. The peripheral surfaces of the opening 12 and the valve plug 13 cooperate to define a seating surface for the valve plug. The upper and lower parts of the opening 12 are counterbored and threaded as indicated at 15 and 16 respectively.

A means cooperates with valve casing 10 for retaining the valve plug in operative assembly, and in the present instance this means is shown as upper retaining nut 17 which is adapted to be screwed into the upper threaded end 15 of the opening 12 and lower retaining nut 18 which is adapted to be screwed into the lower threaded end 16 of the opening 12. The valve plug 13 is provided with means for rotating the valve plug, which may comprise a plug stem 20 integral with the valve plug and projecting through the retaining nut 17. The retaining nuts 17 and 18 and the plug stem 20 are provided with heads 21, 22 and 23, respectively, which are adapted for engagement by suitable tools.

The valve plug is limited to a quarter turn. As an instance of this arrangement a collar 24 is mounted on the plug stem 20 by means of a set screw 25 and is provided with an arm 26 which is adapted for limited movement between the stops 27 and 28 which are secured to the valve casing 10.

An annular groove 30 is provided in the upper end of the lower retaining nut 18 and a roller bearing 31 is adapted to be inserted therein. An anti-frictional bearing is thus provided between the valve plug 13 and the lower retaining nut 18, when said retaining nut has been screwed into the threaded end 16 of the opening 12 for seating the valve plug 13 relative to the bearing surface of opening 12, and the valve plug may then be freely turned relative to said lower retaining nut 18 for opening or closing the valve.

Means are provided to positively and definitely seal the upper retaining nut 17 and the lower retaining nut 18 from the valve casing 10. As an instance of this arrangement, an annular groove 32 is provided in the outer periphery of the upper retaining nut 17 adjacent the threaded end 15 of the opening 12. Obviously, this annular groove might be provided in the inner periphery of the threaded end 15 adjacent said upper retaining nut 17 or partly in the outer periphery of said retaining nut and partly in the inner periphery of said threaded end 15. The annular groove 32 communicates with a sealing liquid chamber 33 which is provided in enlarged lateral bore 34 in the valve casing 10 by means of lateral bore 35.

A like means is provided to positively and definitely seal off the lower retaining nut 18 from the valve casing 10. Annular groove 36 is provided in the outer periphery of the lower closure nut 18 adjacent the threaded end 16 of the opening 12. Instead of providing the annular groove 36 in the outer periphery of the retaining nut 18 it might be provided in the inner periphery of the threaded end 16 adjacent said retaining nut 18 or partly in the outer periphery of said retaining nut 18 and partly in the inner periphery of said threaded end 16 as shown in Fig. 6. The annular groove 36 communicates with a sealing fluid chamber 37 which is provided in enlarged lateral bore 38 in the valve casing 10 by means of lateral bore 39.

The plug stem 20 is provided with a lubricant chamber 40 which is provided in enlarged axial bore 41 in the upper end of said plug stem, and an axial bore 42 in the lower end of said plug stem.

Annular grooves 43 are provided at the seating surface of the valve, and these annular grooves are preferably spaced longitudinally of the valve at opposite sides of the transverse bore 14, and in the present example are formed in the bearing surface of the plug rather than in the cooperating bearing surface of the opening 12. The annular grooves 43 are connected to the lubricant chamber 40 in the plug stem 20 by means of axial bore 42, a lateral bore 44, and a longitudinal groove 45.

Fluid chambers 33, 37, and 40, may be similar in construction and are provided with means so that the fluid may be forced from said fluid chambers under pressure and preferably with check means in order to prevent the return of the fluid under pressure to the fluid chambers. Although check means of usual construction and mode of operation may be used, I prefer to use the check means illustrated in the drawings.

Said check means does not constitute a part of the present invention. It is the invention of one John W. MacClatchie, as embodied in copending application entitled, "Lubricating Means," Serial No. 223,676, filed August 8, 1938. In this construction, the lower ends of the bores 34, 38 and 41 form tapered seats 49, and the outer ends of said bores are provided with left-handed threads 50 into which cylinders 51 provided with like left-handed threads 52 are adapted to be screwed. Each cylinder 51 is provided with a tapered seating surface 53, the angle of said seating surface 53 to the axis of the bore in which the cylinder is threaded, in each instance, being no greater, and preferably appreciably smaller, than the angle formed by the tapered seat 49 to the axis of the bore in which the cylinder 51 is threaded. This is in order to provide definite, absolute, and positive shut-offs or seals when the cylinders 51 are in closed position.

Figure 3:
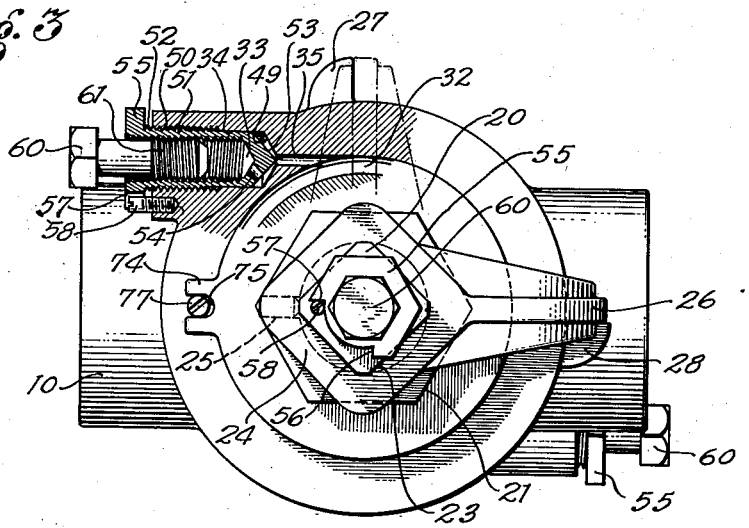
Fig. 3 is a plan view of the plug valve shown in Fig. 1 with parts broken away, with both the plug valve and the lubricating means in the plug stem in closed position.
Figure 4:
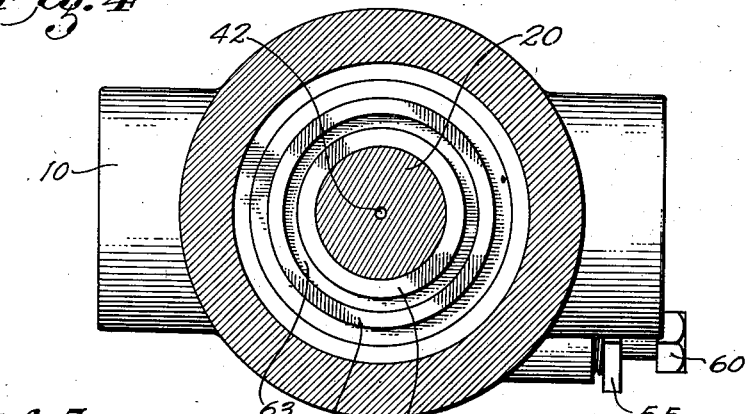
Fig. 4 is a sectional view taken on the line 4—4 of Fig. 1.
Figure 5:
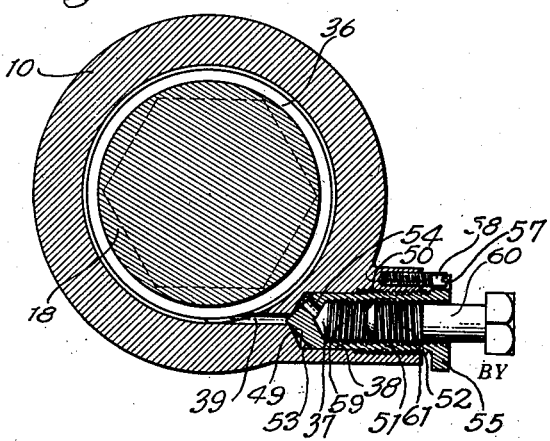
Fig. 5 is a sectional view taken along the lines 5—5 of Fig. 1.

The cylinders 51 are constructed with bores and thus provide fluid chambers 33, 37 and 40. An opening 54 is provided through the tapered seating surface 53 of each cylinder 51 which opening is located as far from the center of the cylinder as convenient. As shown in Figure 3, the outer ends of the cylinders 51 may be provided with hexagonal nuts 55, part of which may be cut away as at 56 and 57. Stop pins 58 may be threaded into the top of the plug stem and the sides of the valve casing 10 within the periphery of the hexagonal nuts 55 in order to limit the movement of the cylinders 51 between closed and a limited open position.

The cylinders 51 are also provided with right-handed internal threads 59 to accommodate pressure screws 60 which are provided with similar threads 61.

The plug valve is adapted to be sealed off by means of the sealing means of my invention. As an instance of this arrangement, in the form shown in Figures 1–5 inclusive, the lower inner face of the upper retaining nut 17 and the upper face of the valve plug 13 are provided with annular recesses 62 and 63 respectively in which the sealing means is adapted to be placed. In this embodiment of the invention, the sealing means consists of two annular sealing rings, 64 and 65, which may be constructed of chrome nickel steel, or some other suitable material which is not affected by the fluid in the line flow which is controlled by the valve. The outer sealing ring 64 is provided with an annular inwardly facing groove 66 and the upper 67 and the lower 68 sides of said outer sealing ring 64 are preferably tapered outwardly toward the outer ends of said groove.

The inner sealing ring 65 is provided with an annular outwardly facing groove 69 and the upper 70 and lower 71 sides of said inner ring 65 are preferably tapered outwardly toward the outer ends of said annular groove 69. However, the sides of said sealing rings need not be tapered, or only the upper sides 67 and 70 of said rings may be tapered outwardly.

Additional metal may be left in the center of the bottom of the sealing rings 64 and 65 which metal serves as a reinforcement to equalize the compression forces that are exerted on the outer ends of the sealing rings, 64 and 65 and to protect said sealing rings against fatigue failure, said metal being indicated at 72.

The grooved ends of the sealing rings 64 and 65 are preferably slightly larger in diameter than the combined depths of the annular recesses 62 and 63, but the other ends of said sealing rings 64 and 65 are preferably somewhat smaller in diameter than the combined depths of said annular recesses 62 and 63.

The space between the sealing rings 64 and 65 communicates with the fluid chamber 33 by means of lateral bore 35, annular groove 32, and longitudinal bore 73.

In assembling the parts, the valve plug 13 being withdrawn from the valve casing, the roller bearing 31 is inserted in the annular groove 30 of lower retaining nut 18 and said lower retaining nut is then screwed into the lower threaded end 16 of the longitudinal opening 12. The valve plug is then inserted in said opening 12. The sealing rings 64 and 65 are then placed around the plug stem in the annular recess 63. The upper retaining nut 17 is then screwed into the upper threaded end 15 of longitudinal opening 12 and the threaded engagement of said retaining nut 17 axially shifts the valve plug until it is properly seated in the valve casing and on the anti-friction bearing 31. After the valve plug is properly seated, it may be secured in proper adjustment. As an instance of this arrangement the retaining nuts 17 and 18 may be provided with enlarged portions 74, said portions having grooves 75. After the valve plug is properly adjusted in the valve casing 10, threaded openings 76 are made in said valve casing in line with said grooves 75 and set screws 77 are screwed into said threaded opening 76, thereby locking said valve plug in proper adjustment in said valve casing.

In order to supply a sealing fluid under pressure to the annular grooves 66 and 69 and thereby maintain the outer edges of the upper sides 67 and 70 of sealing rings 64 and 65 respectively in sealing engagement with the adjacent lower surface of retaining nut 17 and the outer edges of the lower sides 68 and 71 of sealing rings 64 and 65 respectively in sealing engagement with the adjacent upper surface of the valve plug 13, the cylinder 51 in lateral bore 34 is turned to the right by means of hexagonal nut 55 until the stop pin 58 is engaged, thereby raising said cylinder 51 from the tapered seat 49. By turning the pressure screw 60 in the fluid chamber 33 to the right, the sealing fluid in said chamber is forced through the opening 54, lateral bore 35, annular groove 32, and bore 73 into the annular grooves 66 and 69 thereby maintaining the outer edges of said annular grooves in sealing engagement with the lower face of said upper closure nut 18 and the upper face of the valve plug. After sufficient sealing fluid has been forced into said annular grooves 32, 66 and 69, the cylinder 51 in said lateral bore 34 is again turned to the left into closed position, and is adapted to remain in said position during the normal operation of said valve.

I prefer to use a semi-solid grease containing asbestos fibers as the sealing fluid, although any suitable sealing fluid may be used.

Lubricant is then forced into the grooves 43 and 45 between the plug and the casing in a similar manner. In other words, the cylinder 51 in the axial bore 41 is turned to the right by means of the hexagonal nut 55 until the stop pin 58 is engaged, thereby raising said cylinder 51 from its tapered seat 49. By turning the pressure screw 60 to the right, the lubricant is forced from the lubricant chamber 46 through the opening 54, axial bore 42, lateral bore 44 and the longitudinal groove 45 into the annular grooves 43. After sufficient lubricant has been forced into said annular grooves 43 and 45, the cylinder 51 is again turned to the left into closed position, and is adapted to remain in said position during normal operating conditions until it is again desired to lubricate said plug valve.

The annular groove 36 is then filled with sealing fluid under pressure from sealing fluid chamber 37 in a similar manner.

The valve is then ready for use, the plug stem 20 being rotated to open or close the valve by alining or non-alining transverse bore 14 with the fluid passageway 11. The valve may be conveniently lubricated and the lubricant replenished during normal high pressure operating conditions at will, without interfering in any manner whatever with the operation of the valve.

When any cylinder 51 is in closed position, the pressure screw 60 in said closed cylinder may be removed and new lubricant or sealing fluid in the form of conventional sticks or otherwise inserted in the fluid chamber after which the pressure screw 60 is again screwed into said cylinder chamber. At all times during re-charging, the fluid in the plug valve below the lubricant chamber is positively and absolutely prevented from escaping through said fluid chambers.

The pressure of the sealing fluid against the sides of the sealing rings is at all times greater than the pressure of the fluid in the flow-line. The result is that the sealing fluid is positively retained in said sealing means and fluid from the flow-line is positively prevented from leaking between the lower sides 68 of sealing ring 64 and the upper face of the valve plug or between the upper side 67 of said sealing ring and the lower face of the retaining nut 17.

In Figure 6, I have illustrated another form of the sealing means of my invention. In this form, sealing rings 80 and 81 are provided with oppositely disposed annular grooves 82 and 83 respectively, said rings being adapted to be mounted one above the other adjacent the plug stem 20'. The sides 84 and 85 of the upper sealing ring 80, and the sides 86 and 87 of the lower sealing ring 81 are preferably tapered outwardly toward the outer ends of said sides.

In this embodiment of my invention, the valve casing 10', and lower retaining nut 18' are exactly the same as valve casing 10, and retaining nut 18, respectively, other than the peripheral groove 32' is formed partly in the valve casing 10' and partly in the retaining nut 17'. The valve plug 13' differs from the valve plug 13 in that the lower part of the plug stem 20' is enlarged, forming an annular shoulder 88. An annular recess 89 is formed in the upper face of the plug, somewhat similar to the recess 63.

The upper retaining nut 17' differs considerably from the upper retaining nut 17, in that it is not only provided with a bore 90 for the plug stem 20' but is also provided with a counterbore 91 and a still larger counterbore 92 in order to provide for a ball bearing 93. The outer portions of the counterbores 91 and 92 and the lower head portion of the plug stem 20' are chamfered as at 94, 95, and 96 respectively for ease in assembly. Another difference in construction is that a lateral bore 97 is provided and the bore 73 is omitted. The bases 98 and 99 of the sealing rings 80 and 81 respectively are preferably slightly smaller in diameter than the difference between the diameters of the counterbore 91 and the bore 90, whereas the distance between the other ends of said sealing rings is preferably slightly greater than the difference between the diameters of said counterbore 91 and said bore 90. This construction insures a tight metal to metal engagement between the outer portions of said sides of said sealing rings and the retaining nut 17' and the valve stem 20' respectively.

The construction of the remainder of the valve, the assembly, and the operation of said valve are deemed to be evident to those skilled in the art from the description set forth herein in connection with the form of the invention shown in Figs. 1-5 inclusive and will therefore not be set forth herein, except as follows:

The assembly of the valve is in part as follows: The roller bearing 31' is inserted in the groove 30' of lower retaining nut 18' and said retaining nut is then threaded into the threaded end 16' of longitudinal opening 12'. The valve plug 13' is then inserted in said opening 12'. The ball bearing 93 is positioned in the recess 89, and the lower sealing ring 81 is forced into position around the plug stem 20' against the upper face of the shoulder 88. The upper sealing ring 80 is then forced into position in the inner end of the counterbore 91. The upper retaining nut 17' is then mounted around the plug stem and threaded into the upper threaded end 15' of longitudinal opening 12' and the engagement of said retaining nut 17' and the ball bearing 93 axially shifts said bearing and the valve plug 13' until said valve plug 13' is properly seated in said valve casing 10' and on the bearing 31'. After the valve plug is properly seated, it may be secured in proper adjustment.

In order to supply a sealing fluid under pressure to the grooves 82 and 83 and thereby maintain the outer edges of the sides of sealing rings 80 and 81 in sealing engagement with the plug stem 20' and the retaining nut 17', the cylinder in the enlarged lateral bore communicating with the annular groove 32' is turned to the right by means of hexagonal nut 55 until the stop pin 58 is engaged, thereby raising said cylinder from its tapered seat. By turning the pressure screw 60 in said cylinder to the right the sealing fluid is forced from the sealing fluid chamber, through the opening in the lower part of said cylinder, the lateral bore communicating with the annular groove 32', the annular groove 32', and lateral bore 97 into the annular grooves 82 and 83 thereby maintaining the outer edges of said grooves in sealing engagement with said retaining nut 17' and plug stem 20'. After sufficient sealing fluid has been forced into said annular grooves 32', 82 and 83, said cylinder is again turned to the left into closed position, and is adapted to remain in said position during the normal operation of said valve.

Figure 8:
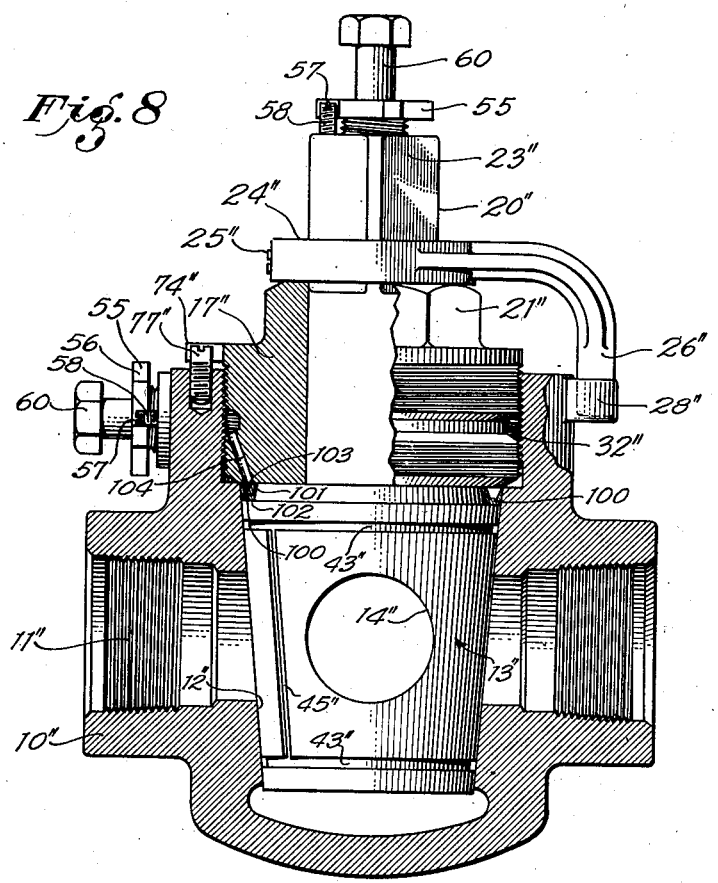
Fig. 8 is a longitudinal section illustrating a modified form of the invention as applied to a different form of plug valve.
Figure 9:
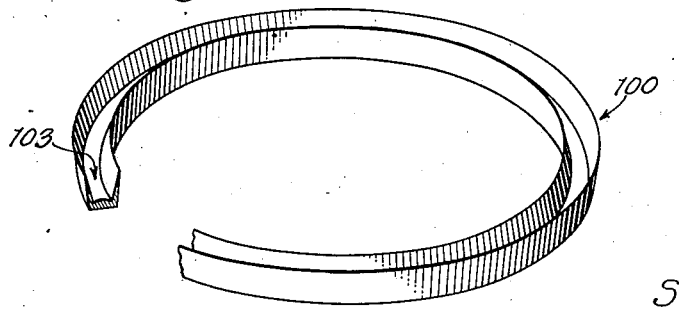
Fig. 9 is an enlarged perspective view of the sealing ring shown in Fig. 8.

In Figure 8, I have illustrated another form of my invention as applied to a different type of plug valve. In this type of plug valve the lower end of the longitudinal opening 12" is closed by the body of the valve casing 10".

In this embodiment of my invention, the seal is effected between the valve casing 10" and the valve plug 13", and a single sealing ring 100 is employed. The outer upper periphery of the valve plug 13" is recessed as indicated by the numeral 101, said recess forming a shoulder 102 on the valve plug. The sealing ring 100 is provided with an annular groove 103 and may be similar in construction to the sealing ring 81. The upper retaining nut 17" is the same as nut 17 other than the bore 73 is omitted and a bore 104 is provided in lieu thereof. The sealing ring 100 is adapted to be forced into position after the plug 20" is inserted in the valve casing. Sealing fluid is adapted to be forced into the annular groove 103 from the sealing fluid chamber communicating with said annular groove 103 in order to maintain the outer edges of the sides of said sealing ring in sealing engagement with the valve casing and the valve plug 13" at all times. The construction of the remainder of the valve, the assembly and the operation of said valve are deemed to be apparent from the description set forth hereinabove in connection with the other forms of my invention which are illustrated herein, and will therefore not be set forth herein.

In each modification of my invention, the pressure of the sealing fluid against the sides of the sealing rings is at all times greater than the pressure of the fluid in the flow line, and the fluid in the flow line is thereby positively prevented from entering the grooved portions of said sealing rings.

In operating plug valves provided with said sealing means, the valve plug may be rotated as desired with a minimum of effort, even though the plug valve is placed in a high pressure flow-line.

While the invention has been particularly described with reference to a plug valve, it will be noted that the sealing means of my invention is applicable to any structure wherein fluid is to be sealed off between cooperating elements.

From the foregoing description taken in connection with the accompanying drawings, the uses, advantages, and operation of the sealing means of my invention will be readily understood by those skilled in the art to which the invention appertains. While I have described the principle of operation together with the forms of my invention as applied to plug valves which I now consider to be the best embodiment thereof, I desire to have it understood that the articles shown are merely illustrative and that the invention is not to be limited to the details disclosed herein, but is to be accorded the full scope of the appended claims.

I claim:

1. A valve for use in high pressure fluid lines comprising a valve casing, a valve plug rotatably mounted in said casing, said valve plug including an upwardly facing annular shoulder and an operating stem projecting upwardly therefrom, an annular member surrounding said operating stem and secured to said valve casing in such position as to restrain said valve plug against axial movement, a circular recess between said annular member and said upwardly facing annular shoulder on said valve plug, a grooved resilient sealing ring having a cross-section of substantially U-shape disposed in said circular recess in such manner that the grooved side faces away from that surface of said valve plug in contact with fluid in the fluid line, means carried by said valve casing for injecting a packing composition into said circular recess and into the groove in said sealing ring whereby those portions of said sealing ring defining the sides of the groove are forced into sealing contact with the walls of said circular recess to thus prevent leakage of fluid from said fluid line around said operating stem and to seal fluid from contact with said packing composition.

2. A valve for use in high pressure fluid lines comprising a valve casing, a valve plug rotatably mounted in said casing, said valve plug including an operating stem projecting from said casing, an annular member surrounding said operating stem and secured to said valve casing in such position as to restrain said valve plug against axial movement, a circular recess between said annular member and said valve plug, a pair of resilient sealing rings each having an annular groove therein, said sealing rings being disposed in said circular recess in such manner that said annular grooves face each other, means for injecting a packing composition under pressure into said circular recess between said annular grooves of said sealing rings whereby said sealing rings are urged into sealing engagement with said valve plug and said annular member to thus prevent leakage of fluid and packing composition around said operating stem and to seal said fluid from contact with said packing composition.

3. A valve for use in high pressure fluid lines comprising a valve casing, a valve plug rotatably mounted in said casing, said valve plug having an upwardly facing shoulder and an operating stem projecting upwardly therefrom, an annular member surrounding said operating stem and secured to said valve casing in such position as to restrain said valve plug against axial movement, a circumferential recess between said annular member and said valve casing, a circular recess between said annular member and said upwardly facing shoulder on said valve plug, a grooved resilient sealing ring having a cross-section of substantially U-shape disposed in said circular recess in such manner that the grooved side faces away from that surface of said valve plug in contact with fluid in the fluid line, means for injecting a packing composition under pressure into said circumferential recess and into said circular recess between those portions of said sealing ring defining the sides of the groove therein whereby said portions are forced into sealing contact with the walls of said circular recess to thus prevent leakage of fluid from the fluid line around said operating stem and to seal such fluid from contact with the packing composition, while fluid under pressure in said circumferential recess prevents leakage of fluid between said annular member and said valve casing.

4. A valve for use in high pressure fluid lines comprising a valve casing, a valve plug rotatably mounted in said casing, said valve plug having an upwardly facing shoulder and an operating stem projecting upwardly therefrom, an annular member surrounding said operating stem and secured to said valve casing in such position as to restrain said valve plug against axial movement, a circumferential recess between said annular member and said valve casing, a circular recess between said annular member and said upwardly facing shoulder on said valve plug, a passageway connecting said recesses, a grooved resilient sealing ring having a cross-section of substantially U-shape disposed in said circular recess in such manner that the grooved side faces away from that surface of said valve plug in contact with fluid in the fluid line, means carried by said valve casing for injecting a packing composition under pressure into said circumferential recess, through said passageway, into said circular recess and into the groove in said sealing ring whereby those portions of said sealing ring defining the sides of said groove are forced into sealing contact with the walls of said circular recess to thus prevent leakage of fluid from the fluid line around said operating stem and to seal such fluid from contact with the packing composition, while packing composition under pressure in said circumferential recess prevents leakage of fluid between said annular member and said valve casing.

5. A sealing assembly comprising a hollow casing the interior of which is subject to high fluid pressure, a rotatable element mounted in said casing with a portion projecting therefrom, an outwardly facing annular shoulder on said rotatable element surrounding said projecting portion, an annular member surrounding the projecting portion of said rotatable element and secured to said casing in such position as to restrain said rotatable element against outward axial movement, a circumferential recess between said annular member and said casing and a circular recess between said annular member and said outwardly facing shoulder on said rotatable element, a grooved resilient sealing ring having a cross-section of substantially U-shape disposed in said circular recess in such manner that the grooved side faces away from the interior of said casing, means for injecting a packing composition into said circumferential recess and into said circular recess between those portions of said sealing ring defining the sides of the groove therein whereby said portions are forced into sealing contact with the walls of said circular recess to thus prevent leakage of fluid from the interior of said casing around the projecting portion of said rotatable element and to seal such fluid from contact with the packing composition, while packing composition under pressure in said circumferential recess prevents leakage of fluid between said annular member and said casing.

STANLEY H. ATKINSON.